(12) United States Patent
Champlin

(10) Patent No.: US 7,152,328 B2
(45) Date of Patent: Dec. 26, 2006

(54) ELECTRIC POLE SAW

(76) Inventor: David Eugene Champlin, 1769 Park City Glasgow Rd., Glasgow, KY (US) 42141

( * ) Notice: Subject to any disclaimer, the term of this patent is extended or adjusted under 35 U.S.C. 154(b) by 0 days.

(21) Appl. No.: 10/692,050

(22) Filed: Oct. 23, 2003

(65) Prior Publication Data

US 2005/0086813 A1   Apr. 28, 2005

(51) Int. Cl.
  *B27B 17/00* (2006.01)
  *B23D 57/02* (2006.01)
(52) U.S. Cl. .................... 30/381; 30/383; 30/296.1
(58) Field of Classification Search .......... 30/381–387, 30/298, 296.1; D8/65; 173/170; 74/543, 74/544
  See application file for complete search history.

(56) References Cited

U.S. PATENT DOCUMENTS 3,731,380 A * 5/1973 Mathiesen ................... 30/381
3,949,817 A * 4/1976 Rice ............................ 30/381
4,207,675 A * 6/1980 Causey et al. ............. 30/296.1
5,884,403 A * 3/1999 Rogers ....................... 30/296.1
6,651,347 B1* 11/2003 Uhl ............................... 30/383
6,904,687 B1* 6/2005 Hill, Sr. ..................... 30/296.1

* cited by examiner

Primary Examiner—Timothy V. Eley
Assistant Examiner—Jason Prone
(74) Attorney, Agent, or Firm—John F. Salazar; Middleton & Reutlinger

(57) ABSTRACT

The present invention is an electric pole saw featuring a novel saw powerhead mounting bracket assembly comprising interlocking bracket halves molded to conform to the opening and contours of the saw provided between the rear handle, knuckle guard and main body of the saw, to control angular movement or twisting between the bracket-halves and between the powerhead and the bracket, and also utilizing single-point fastening means for fast and easy assembly of the bracket without tools.

16 Claims, 10 Drawing Sheets

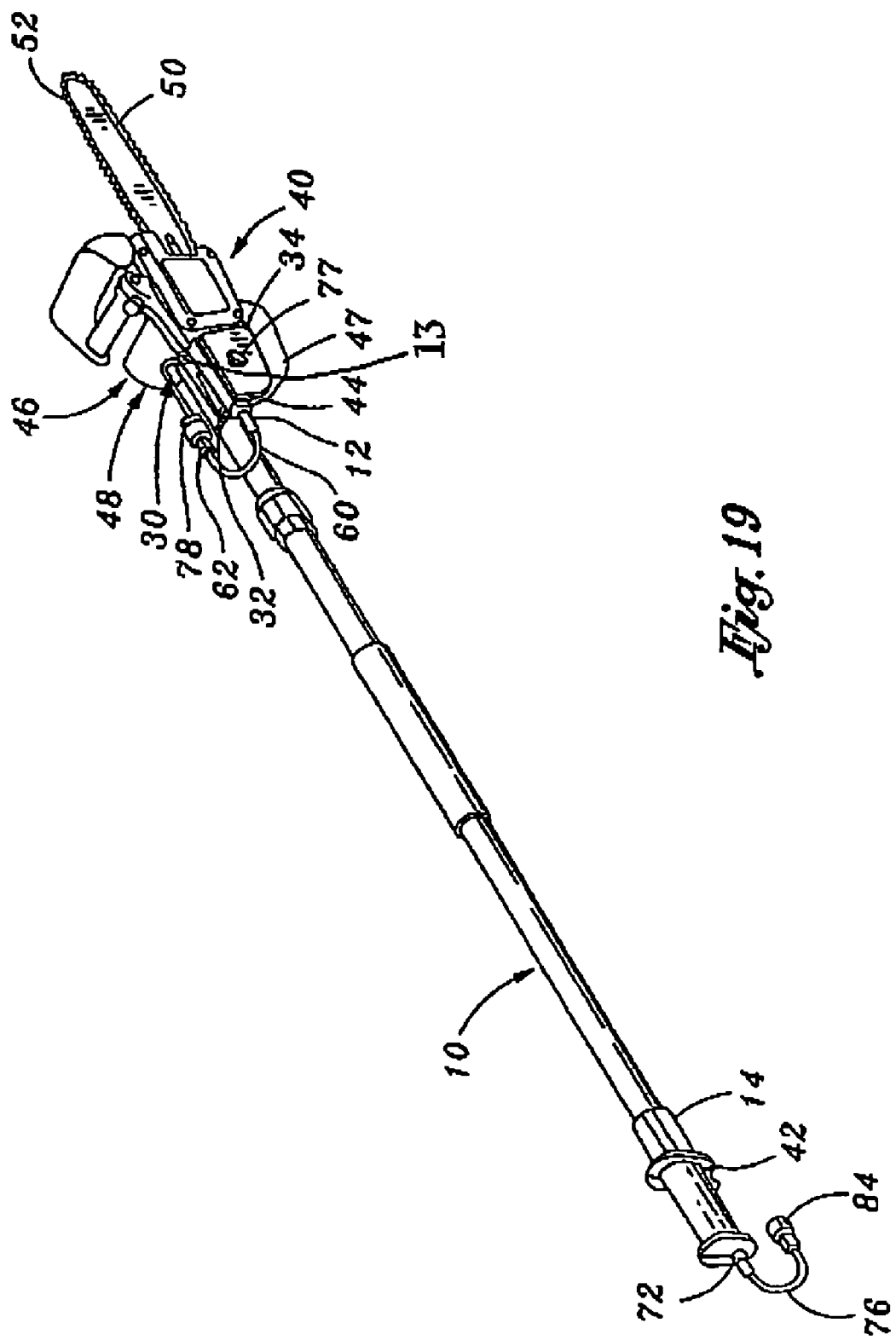

ELECTRIC POLE SAW

BACKGROUND OF THE INVENTION

A. Technical Field

The present invention relates generally to electric-powered garden tools. More specifically, the present invention is an electric pole saw featuring a novel saw powerhead mounting bracket assembly comprising interlocking bracket halves molded to conform to the opening and contours of the saw provided between the rear handle, knuckle guard and main body of the saw, to control angular movement or twisting between the bracket-halves and between the powerhead and the bracket.

B. Background

Methods for pruning tree limbs in the past have involved climbing the tree and cutting the limb with a saw while in the tree. This limb removal method presents considerable risk of injury to the person performing the method. Not only does that person have a risk of falling out of the tree, but also the person stands the chance of cutting himself or herself due to the sometimes unstable position the person must assume while in the tree. This risk is further increased with the use of power saws such as electrically-powered or gasoline-powered chain saws because their increased cutting speed makes severe injuries more likely.

To overcome these risks, some persons use "cherry-picker" bucket trucks which include a bucket attached to a crane to prune trees. To use the bucket truck, the saw operator stands inside the bucket, moves the crane to position the bucket adjacent the selected location on the limb, and cuts the limb at the selected location. However, in densely-limbed trees, maneuvering the bucket to the position adjacent the selected location can be difficult and sometimes necessitates cutting additional branches to gain access to the selected location. Thus, this method may require additional time and effort because additional cuts must be made. Further, the additional cuts may be required on limbs which the person does not wish to cut because of the overall desired tree shape. Still further, bucket trucks are expensive to purchase or rent, thereby making this method cost prohibitive for many persons. In addition, because the user may be placed in the vicinity of overhead power lines, this method presents a risk of electrical shock to the user.

To overcome these previously described disadvantages, several prior art devices have been developed which comprise saws mounted on extensions so that the saws may be used to trim the limbs while the user remains on the ground. One prior art saw and extension includes a short pole attached to a typical gasoline-powered chain saw. The pole includes a mechanical control cable extending from the chain saw accelerator to an auxiliary trigger mechanism attached to the pole remote from the chain saw. Thus configured, the user may raise the chain saw to a selected location somewhat remote from the user and accelerate the saw using the auxiliary trigger mechanism to cut the limb at the selected location.

A primary drawback of prior art chain saw extensions having the saw positioned remote from the user is that only relatively short extensions are practical because the weight of the chain saw is centered at a mechanically disadvantageous position. Thus, only limbs which are fairly close to the user may be trimmed using this type of extension because the extension must be relatively short to permit the saw to be lifted and used without undue user strain or fatigue.

Several prior art extension devices have overcome this problem by using lighter weight electrically-powered chain saws. Electrically-powered chain saws are connected to electrical cables which feed electricity to their motors to drive the cutter teeth. By controlling the flow of current through the electrical cables with a variable resistance controller, the speed of the saw may be regulated. Because the electrically-powered chain saws are typically lighter weight than gasoline-powered saws, longer extensions may be used without user strain or fatigue. However, even though chain saw extensions of this type may be longer than gasoline-powered chain saw extensions, they are still limited by the weight of the saw.

Other attempts to overcome the practical weight constraints involve chain saw extensions including a typical gasoline-powered chain saw motor driving a series of belts and pulleys extending through a tubular extension attached to the motor. The belts extend to a sprocket which drives a typical chain saw chain having cutter teeth which travel on a cutter bar mounted to the extension. Thus configured, the saw motor is positioned adjacent the user while the chain is used to cut limbs remote from the user. Because the relatively heavy motor portion of the chain saw is positioned near the user and may even be advantageously positioned behind the user to counter-balance the extension, longer extensions are practical than with the previously described prior art extensions which have the saw motor positioned adjacent the cutter teeth.

There are other prior art chain saw systems which use different power transmission apparatus in place of the belt and pulley system described above. For instance, a prior art chain saw uses a rotating flexible cable to transmit the power from the motor to the cutter bar. Because the cable is relatively light weight, the overall weight of the chain saw extension is reduced to permit longer extensions.

In order to further overcome the weight constraints associated with saws mounted on extensions, at least one prior art device uses the mechanical advantage of a fulcrum and lever to aid in lifting the saw and extension. Thus, longer extensions are practical. However, the fulcrum can make the system difficult to maneuver into position.

There are several electric pole saws on the market that offer the feature of detaching the powerhead from the pole to use as a stand-alone, hand-held chain saw. These electric pole saws use a method for fixing the powerhead to the pole assembly which involves a two-piece bracket to enclose or grip the rear handle area of the powerhead. See FIGS. 1–8, which depict prior art pole saw designs. As shown in FIGS. 2–3 and 4–5, the brackets used in the current technology are stamped metal brackets, with one-half of the bracket containing an engagement finger which engages the trigger/switch mechanism of the powerhead in an activated position. This method uses multiple clamping or fastening points to effect the attachment. As shown in FIG. 8 the prior art brackets use four fastening points to effect the attachment of the powerhead to the pole assembly. The multiple fastening locations between the bracket halves serve to:

1) Provide clamping force between the two halves of the bracket;

2) Directly resist any moment transmitted from the guide bar to the bracket—resulting in relative twisting between the halves of the brackets; and 3) Capture and hold the powerhead trigger/switch mechanism in an activated position to provide electrical continuity between the electric motor and a remote switching mechanism in the pole assembly.

The drawbacks of this technology are:

1) Using stamped brackets to enclose the rear handle area, there are no inherent features in the brackets which resist or control relative motion or twist between the bracket halves; this requires a minimum of two fixing locations to control angular movement between the bracket halves;

2) Four fixing locations are required to control angular movement (the possibility of bi-directional angular movement);

3) Any significant twisting motion between the two bracket halves creates pressure between the powerhead's trigger and the engagement finger on the bracket. This resulting force between the trigger and the bracket's engagement finger can deflect the engagement finger to the yield point—which sometimes results in a malfunction of the pole saw because of the trigger not being actuated by the engagement finger. See FIGS. 9 and 10, which depict the moment from cutting action using a pole saw; and 4) The number of fasteners required to fasten the brackets together complicates the assembly or disassembly of the powerhead to the pole assembly, and lengthens the amount of time required to accomplish assembly or disassembly.

SUMMARY OF THE INVENTION

The present invention is an electric pole saw comprising an electric chain saw having a handle, a main body, a trigger, and a power cord; a pole member having an upper end and a lower end; a bracket assembly provided near said upper end of said pole member for receiving said handle of said electric chain saw and releasably mounting said chain saw on said pole member adjacent said upper end thereof, said bracket assembly comprising two rigid mounting bracket halves, one of which is fastened to said pole member near said upper end of said pole member, said bracket halves having surface features that generally conform to the opening and contour created between said handle and said main body of said chain saw, a trigger depression device operative to support said trigger of said saw in a depressed "on" position and fastening means for releasably securing said bracket halves to said chainsaw handle.

The present invention overcomes the above-referenced limitations of electric pole saws by using, in a preferred embodiment, a molded plastic mounting bracket assembly comprising two bracket halves with internal features that generally conform to the opening and contours on the saw provided between the rear handle, knuckle guard and main body of the saw. While molded plastic bracket halves are used in a preferred embodiment of the invention, alternative methods of cast metal bracket halves are also considered to be covered by the scope of this invention. One half of the bracket is permanently fixed to the pole assembly and one bracket half is free-standing for assembly. The bracket halves each have complementary features enabling a locking interaction between the two bracket halves. The interacting features between the two bracket halves control angular movement or twisting between the bracket halves, while the general profile and contour of the brackets control angular movement between the powerhead and the bracket.

This invention contains an integral feature in the bracket which engages the trigger of the pole saw powerhead. Combined with the interlocking aspects of the two bracket halves, which eliminates the relative twisting between the bracket halves, this prevents the trigger from being inadvertently actuated. These features improve the reliability of the attachment of the powerhead to the pole saw and permit the use of a single fixing location. The single fixing location provides clamping force between the bracket halves but is not required to control twisting between the bracket halves.

Elimination of the multiple bracket fasteners simplifies assembly and disassembly of the powerhead to the pole assembly, and significantly reduces the time to accomplish assembly and disassembly, thereby enhancing the multiple functions as a hand-held chain saw and pole saw.

This single fastening location facilitates the use of fasteners which provide toolless assembly and disassembly of the chain saw from the pole assembly. The preferred embodiment uses a threaded fastener with a knob. There are other types of toolless fastening methods available, and this invention is not intended to be limited in any way by the type of toolless fastener that may be used.

BRIEF DESCRIPTION OF THE DRAWINGS

FIG. 19 is a side perspective view of the electric pole saw of the present invention.

DESCRIPTION OF A PREFERRED EMBODIMENT OF THE INVENTION

Figure 1:
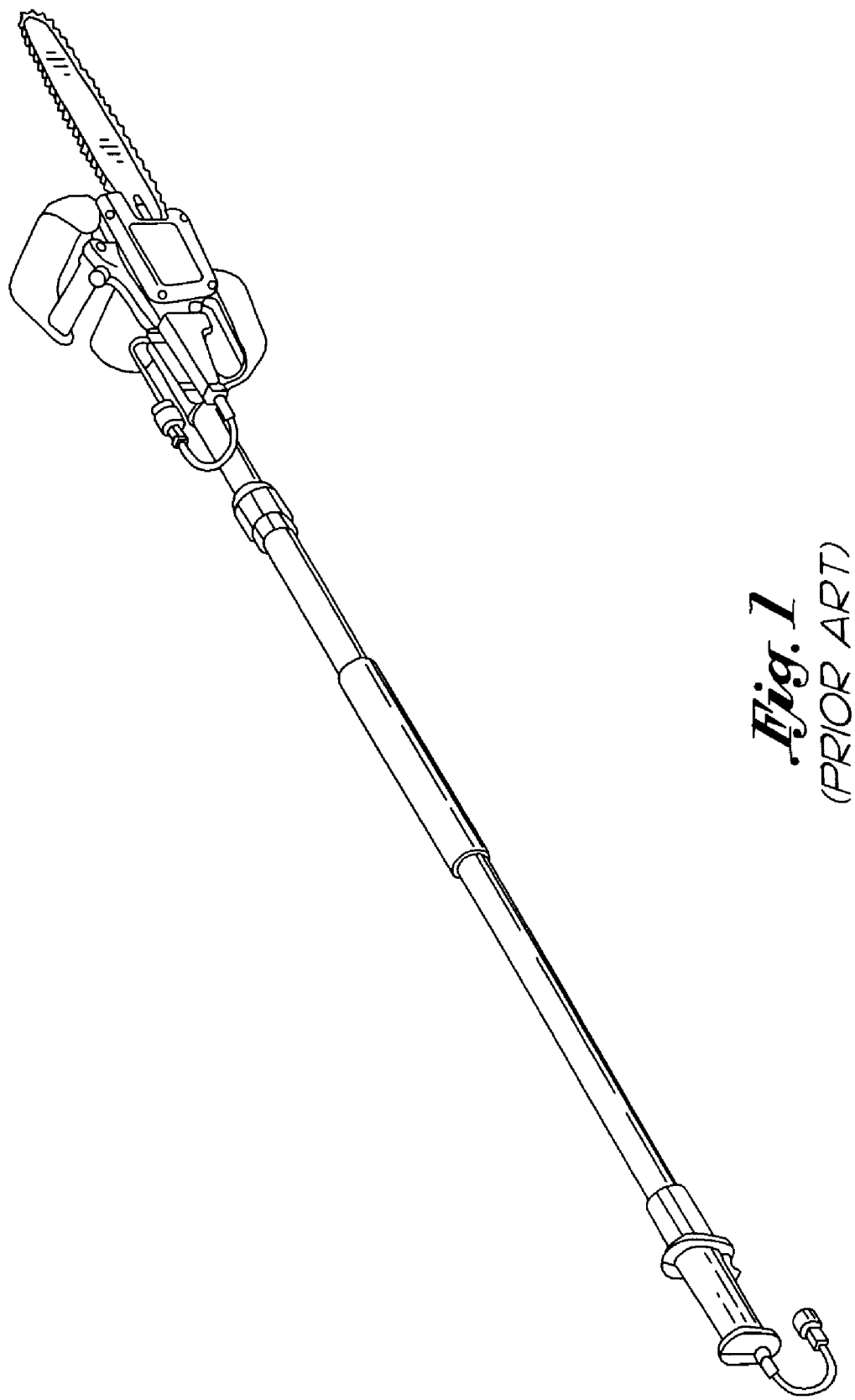
FIG. 1 depicts a prior art electric pole saw, showing two-piece bracket, pole assembly and powerhead.
Figure 2:
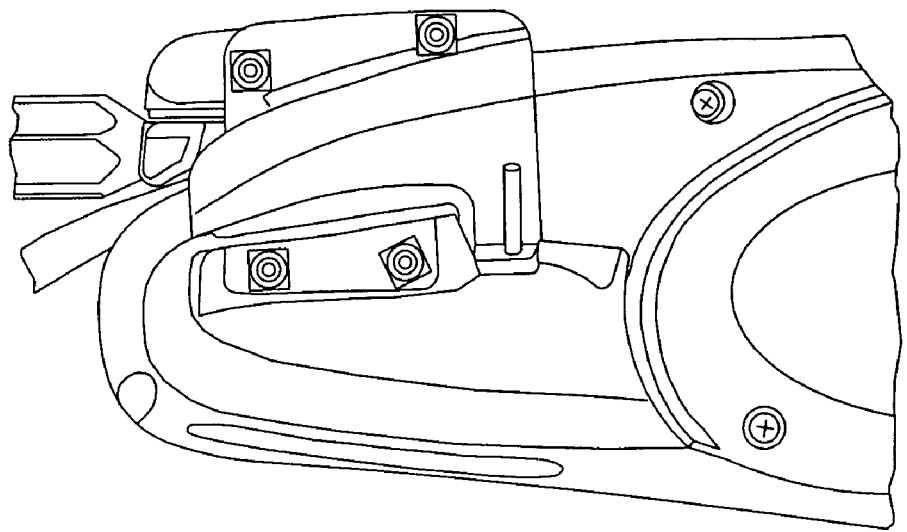
FIG. 2 depicts a close-up of an assembled bracket for a prior art pole saw.
Figure 3:
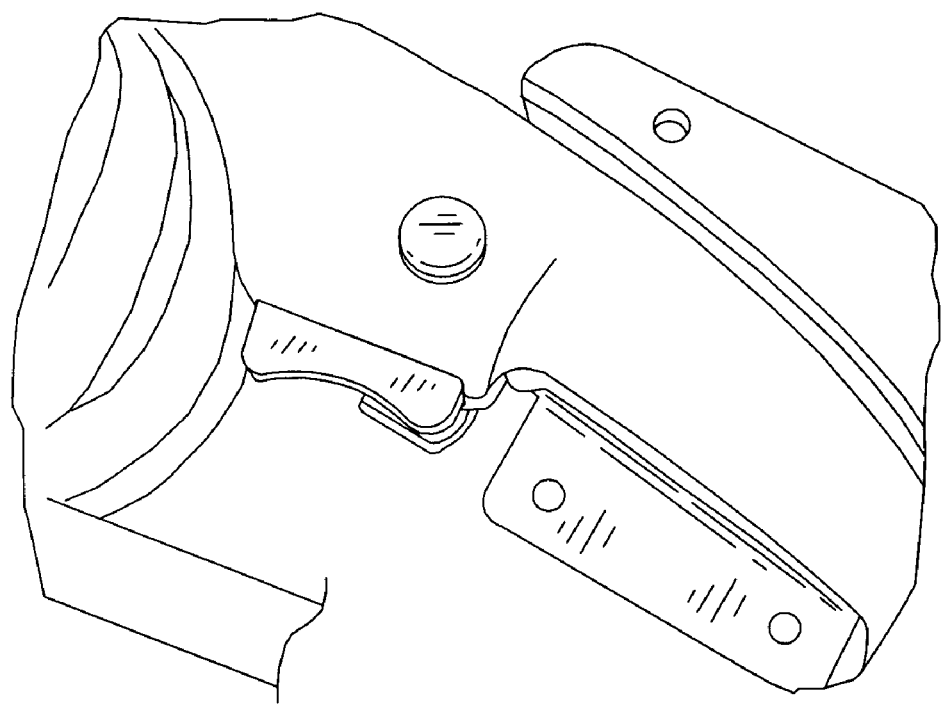
FIG. 3 depicts a close-up of an unassembled bracket for a prior art pole saw.
Figure 4:
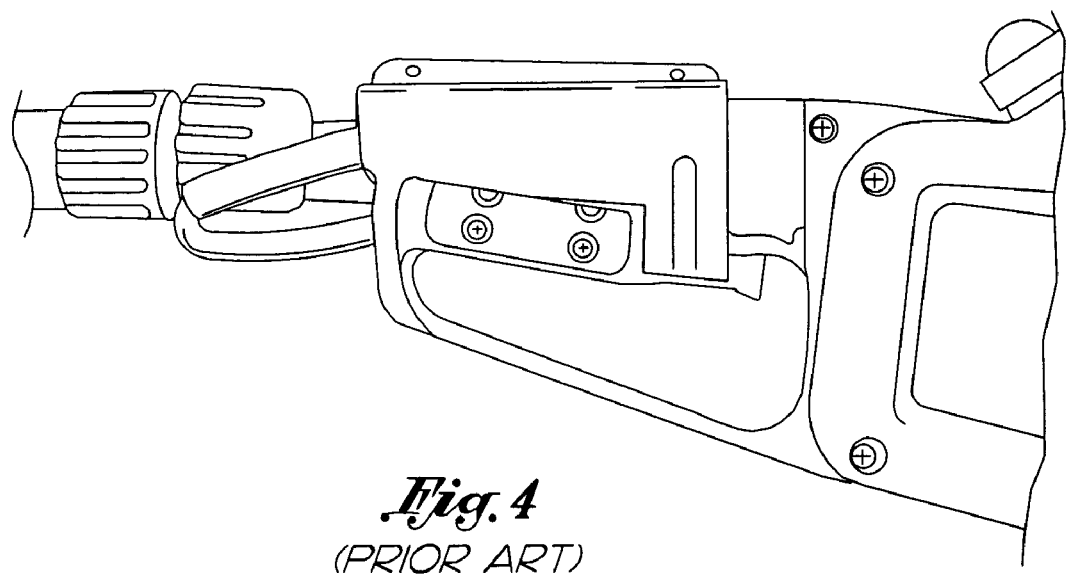
FIG. 4 depicts a close-up of an assembled bracket for a prior art pole saw.
Figure 5:
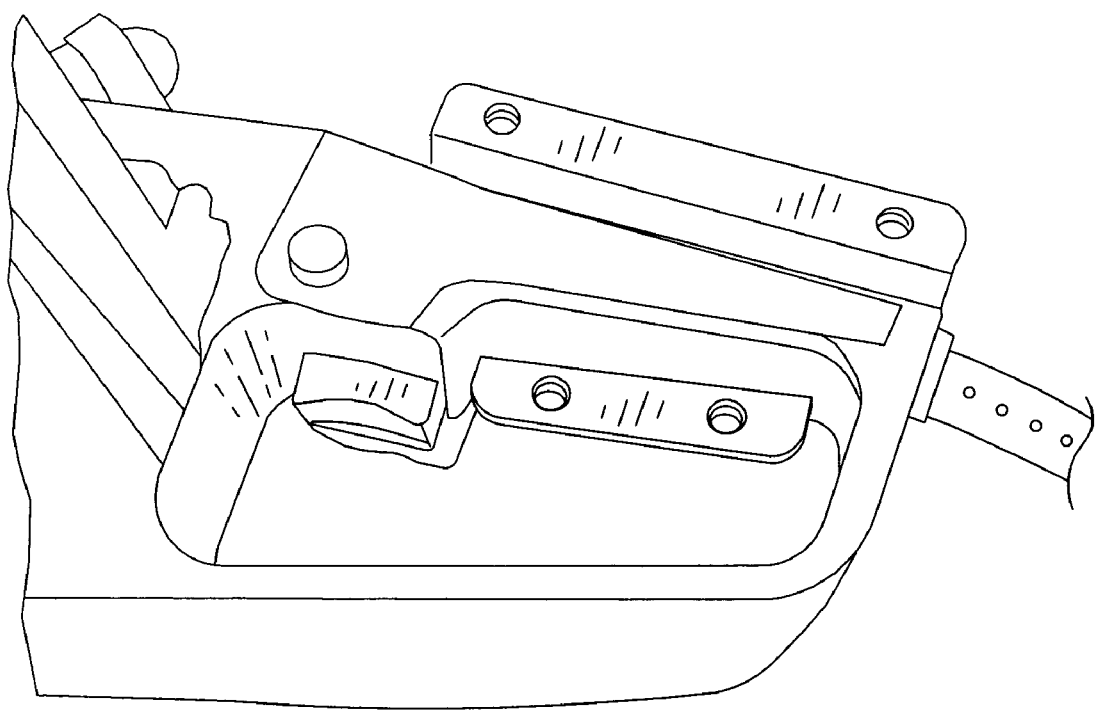
FIG. 5 depicts a close-up of an unassembled bracket for a prior art pole saw.
Figure 6:
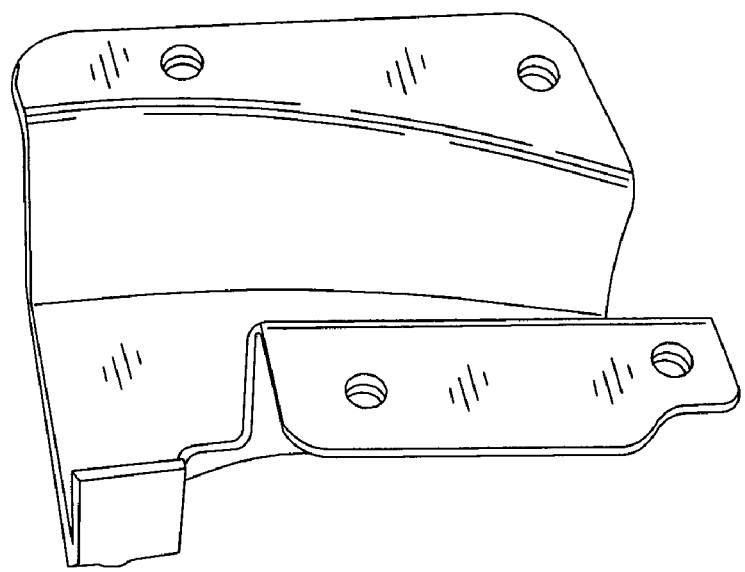
FIG. 6 depicts an engagement finger of a prior art pole saw bracket, showing trigger engagement finger.
Figure 7:
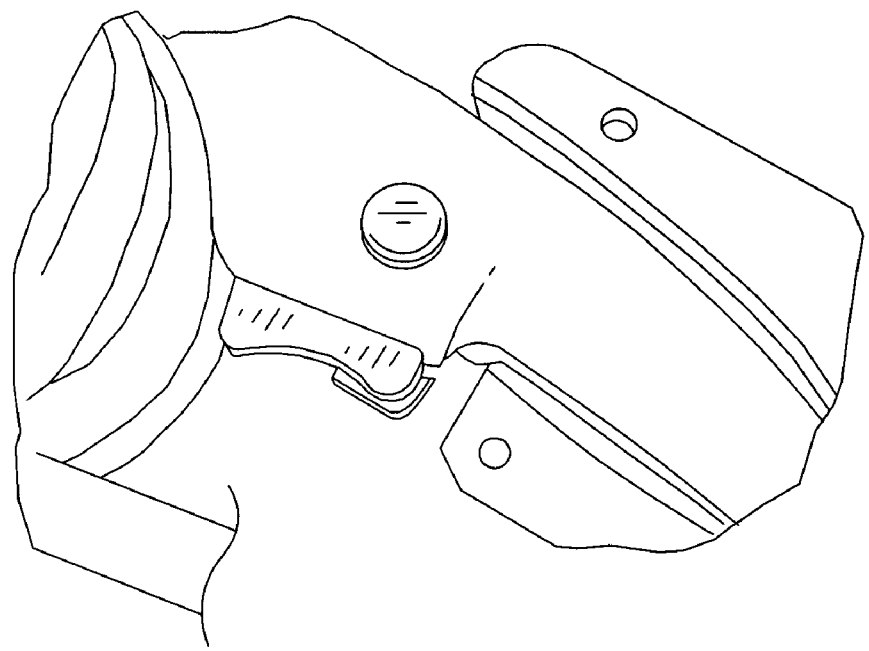
FIG. 7 depicts an engagement finger of a prior art pole saw bracket in assembled state, showing trigger engagement finger.
Figure 8:
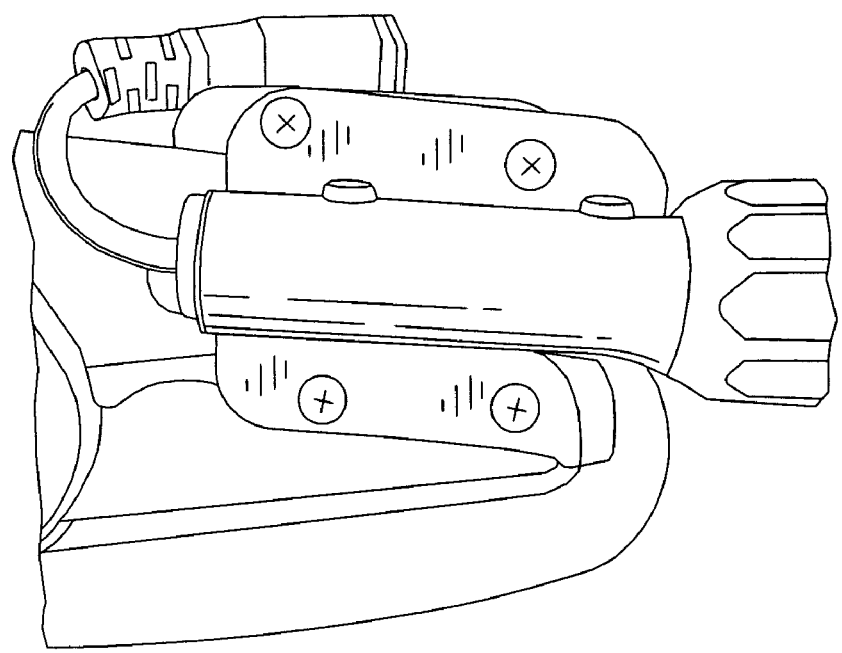
FIG. 8 depicts the four fastening locations required with existing brackets—prior art unit shown.
Figure 9:
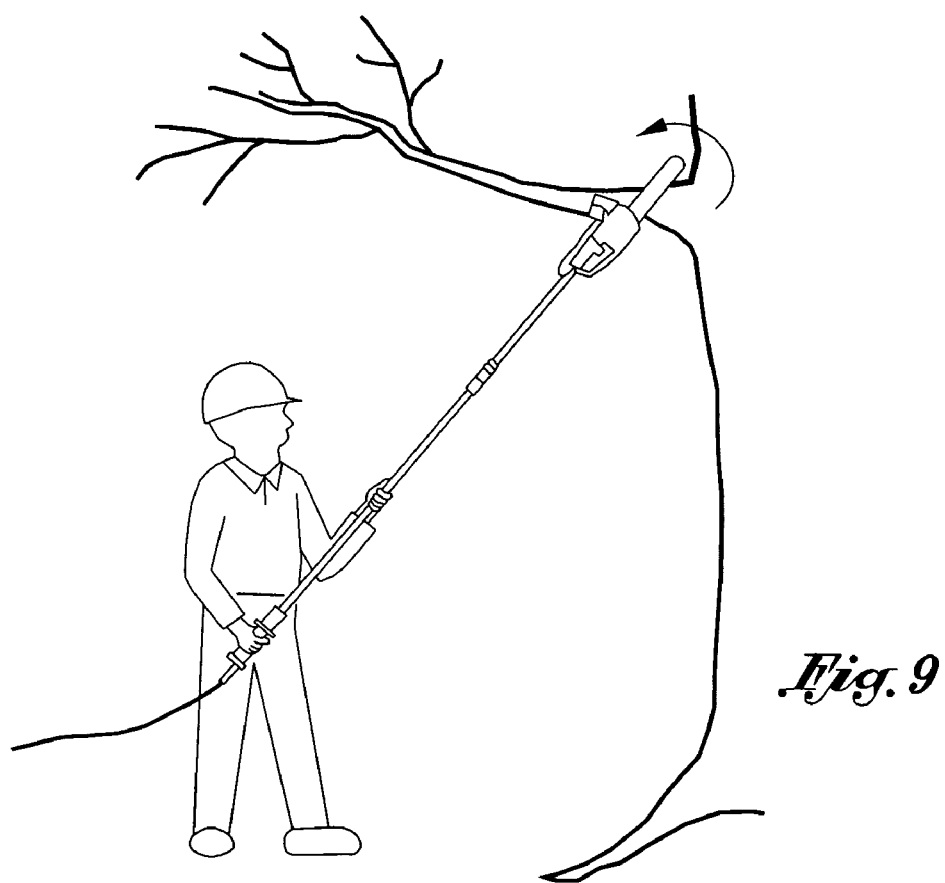
FIG. 9 depicts the moment created from cutting action of pole saw.
Figure 10:
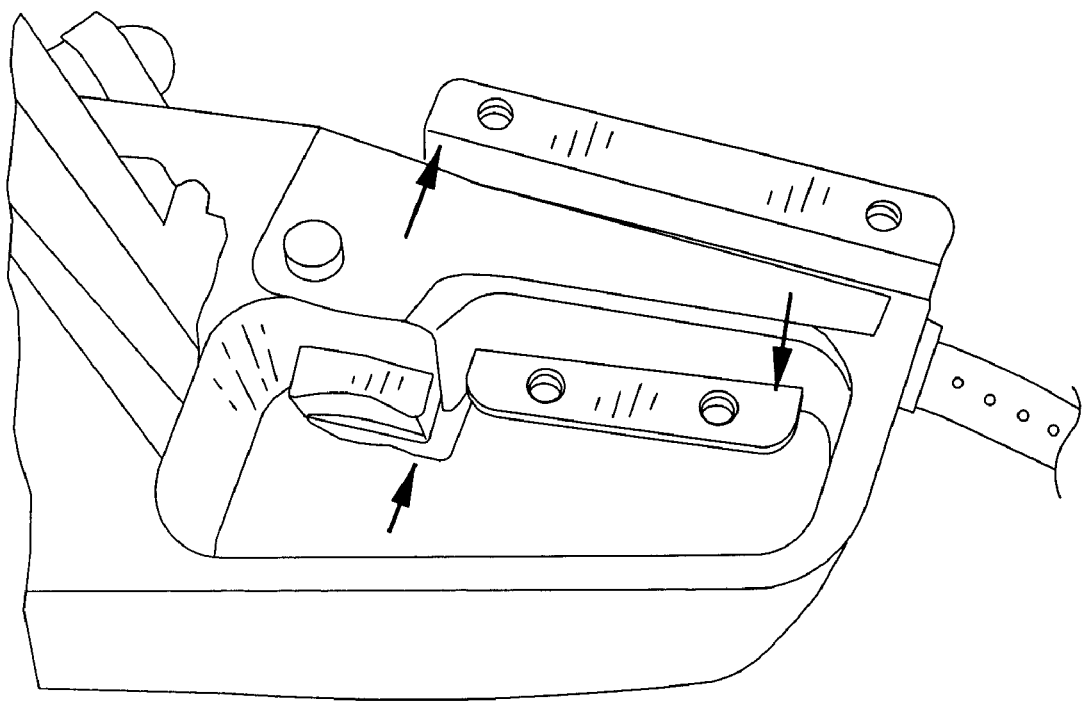
FIG. 10 depicts the focal points of applied moment from cutting action of saw, showing point of possible deflection of bracket's engagement finger and example of points where moment from cutting action is transferred to the current bracket technology.

Referring now to FIG. 19, according to a preferred embodiment hereof, the present invention is an electric pole saw comprising a pole member 10 having an upper end 12 and a lower end 14. A mounting bracket assembly 30 is provided on the upper end 12 for releasably mounting an electric chainsaw 40 to said pole member 10. A remote switch 42 is mounted on the pole member 12 adjacent to its lower end 14 and is coupled electrically to the chain saw 40 to enable remote operation of the saw 40. The mounting bracket 30 enables the saw 40 to be dismounted from the pole member 10, allowing it to be used in the usual manner when desired.

The saw 40 is preferably a conventional electric chain saw and may comprise any of a number of saws available on the market such as, for example, a REMINGTON® 1.5 HP 10-inch cut. The saw 40 includes a plastic casing 46 which houses an electric motor 48 and mounts an elongate bar 50 extending forwardly of the casing 46. A chain 52 is trained about the bar 50 and is drivingly coupled to the motor 48 by a sprocket (not shown) in a conventional manner.

Figure 14:
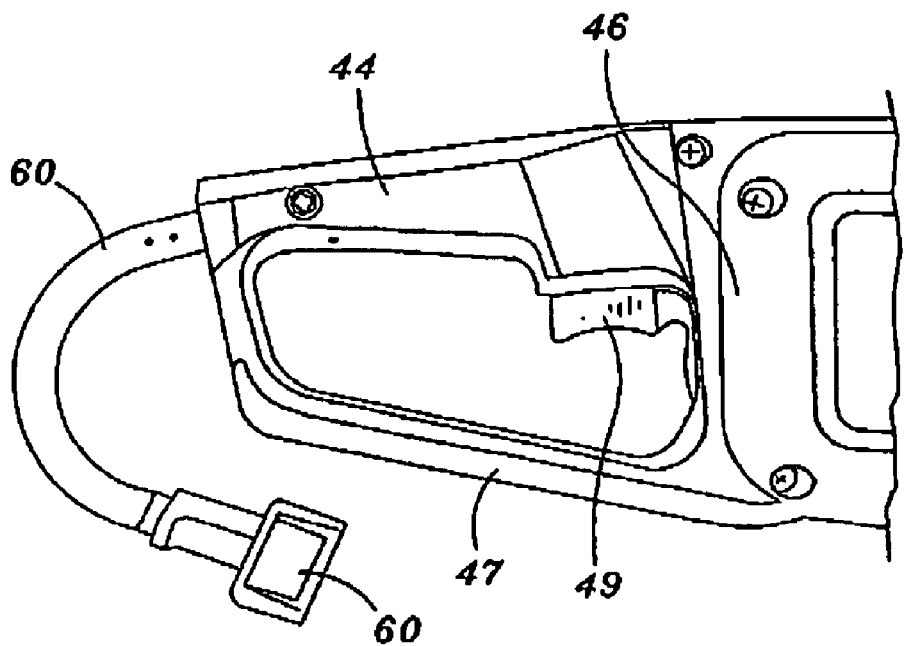
FIG. 14 depicts a contoured opening of pole saw powerhead handle of the present invention, showing rear handle, main saw body and knuckle guard.

An electrical power cord 60 extends from the casing 46 and carries a plug 62 at its free end. The cord 60 is wired to the motor 48 through a trigger switch 49 projecting from a handle 44 of the casing. The trigger 49 is normally biased outwardly of the handle 44 to open the circuit between the power supply and the motor 48, but is operable when the trigger 49 is depressed. The handle 44 preferably has a conventional knuckle guard 47 which provides a support surface for the mounting bracket 30. FIG. 14 depicts the handle 44, casing 46 and knuckle guard 47.

Figure 13:
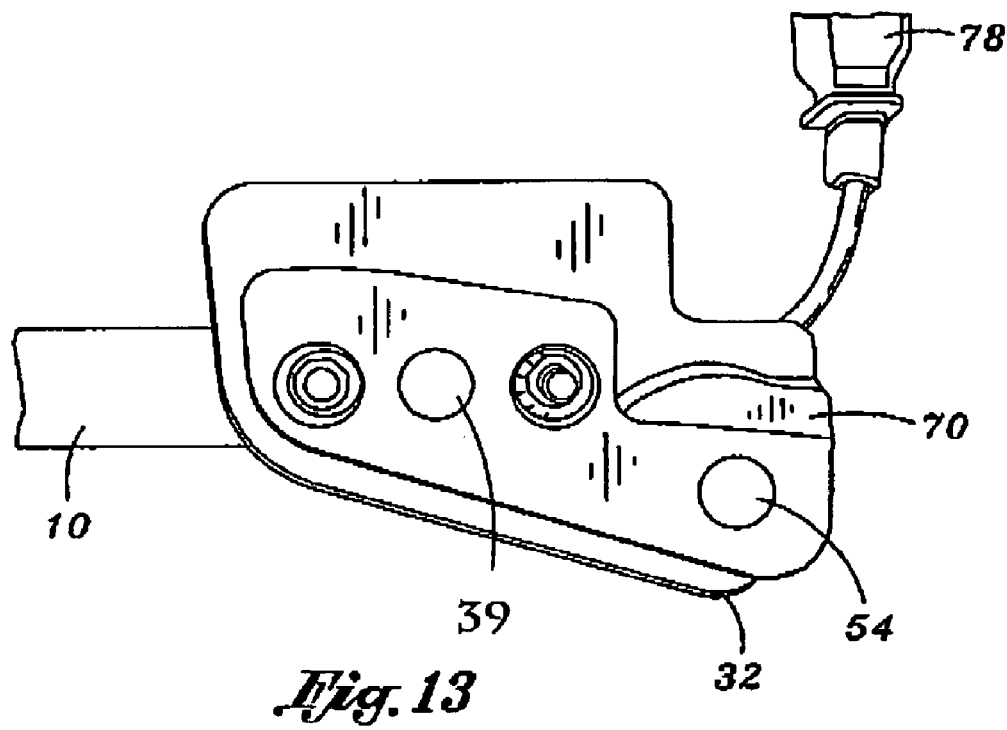
FIG. 13 depicts an unassembled pole bracket of the present invention showing the contoured profile to generally conform to the opening and contours of the powerhead handle, trigger engagement feature and interlocking features to control angular position and twisting between bracket halves.
Figure 15:
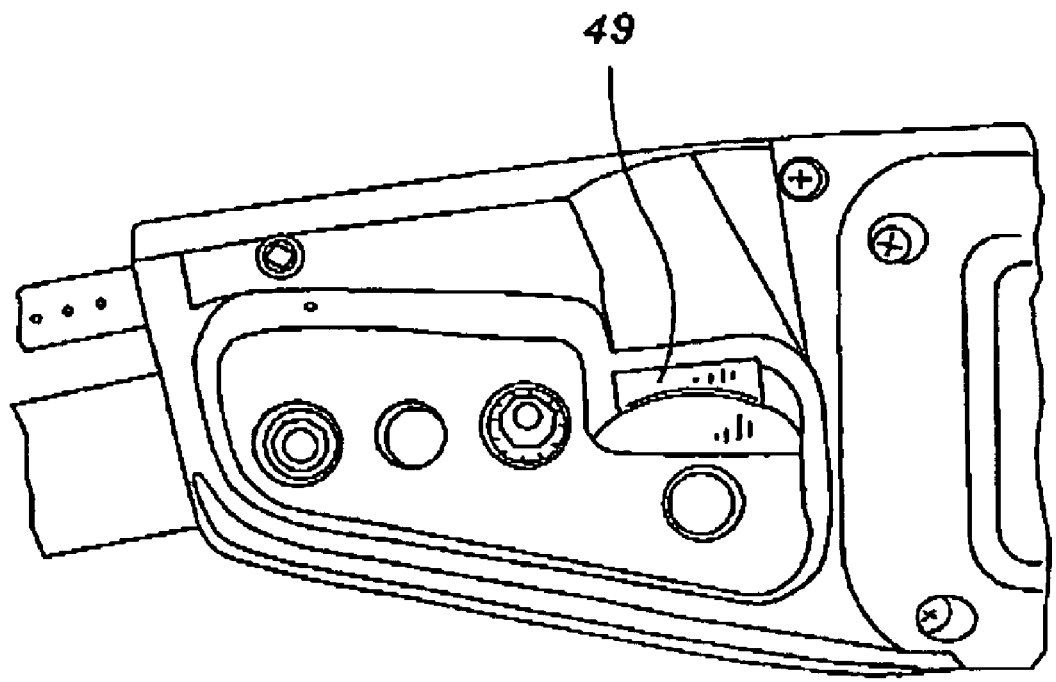
FIG. 15 depicts a pole saw powerhead assembled on pole side bracket half of the present invention.

Referring to FIGS. 13 and 15, the trigger switch 49 is disabled by a trigger engagement feature that is integral to one of the mounting bracket assembly halves 70 such that the circuit remains closed at all times between the cord 60 and motor 48. FIG. 13 depicts the trigger engagement feature 70 in a preferred embodiment integral to the mounting bracket half 32 that is fastened to the pole member 10.

Figure 12:
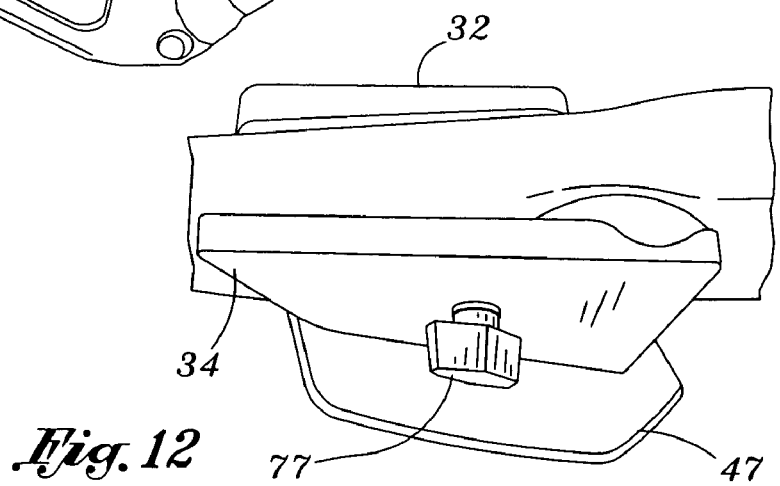
FIG. 12 depicts a top view of the fully-assembled bracket assembled with pole saw powerhead—showing a single fixing location as embodied in the present invention.

Referring to FIGS. 12 and 13, the bracket 30 comprises a pair of molded or cast mounting bracket halves 32 and 34 with features that generally conform to the opening and contour created between the handle 44 and the main body casing 46 of said chain saw 40. As shown in FIG. 12, the handle 44 and rear portion of casing 46 of the saw 40 are received in the space between the bracket halves 32 and 34.

Referring to FIG. 13, the first bracket half 32 of the bracket 30 is preferably mounted to the pole member 10. Conventional nuts and bolts, as depicted in FIG. 15, or other suitable fastening means can be used to fasten the first bracket half 32 to the upper end 12 of the pole member 10. FIG. 13 shows the first bracket half 32 mounted at the upper end 12 of pole assembly 10 through the use of two bolts and nuts fastened through a pair of holes through the face of the bracket half 32. As shown in FIG. 13, the first bracket half 32 has one or more features 52 and 54 disposed on the surface that receives the saw handle 44 that are complementary and interlock with one or more mating features disposed on the surface of second bracket half 34 that rests against the saw handle 44 when the mounting bracket 30 is assembled. The first bracket half 32 confronts the top surface of the handle 44 of the casing 46. A hole 39 is disposed through the central portion of the face of the first bracket half 32 to receive the bolt portion of the single point bracket fastening means.

Figure 16:
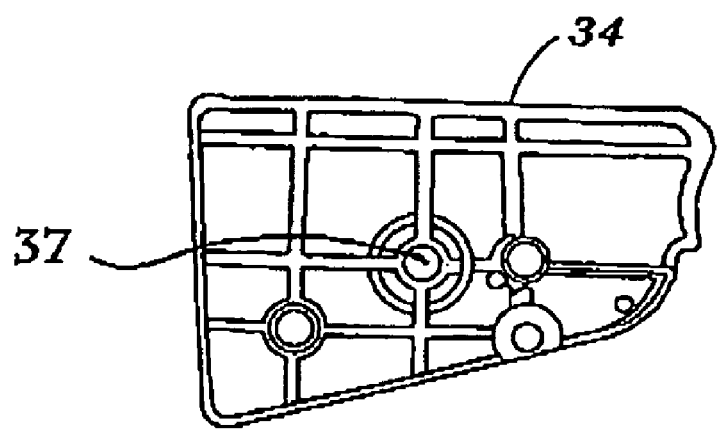
FIG. 16 depicts an interior view of free-standing pole saw bracket half of the present invention, showing interlocking features.
Figure 17:
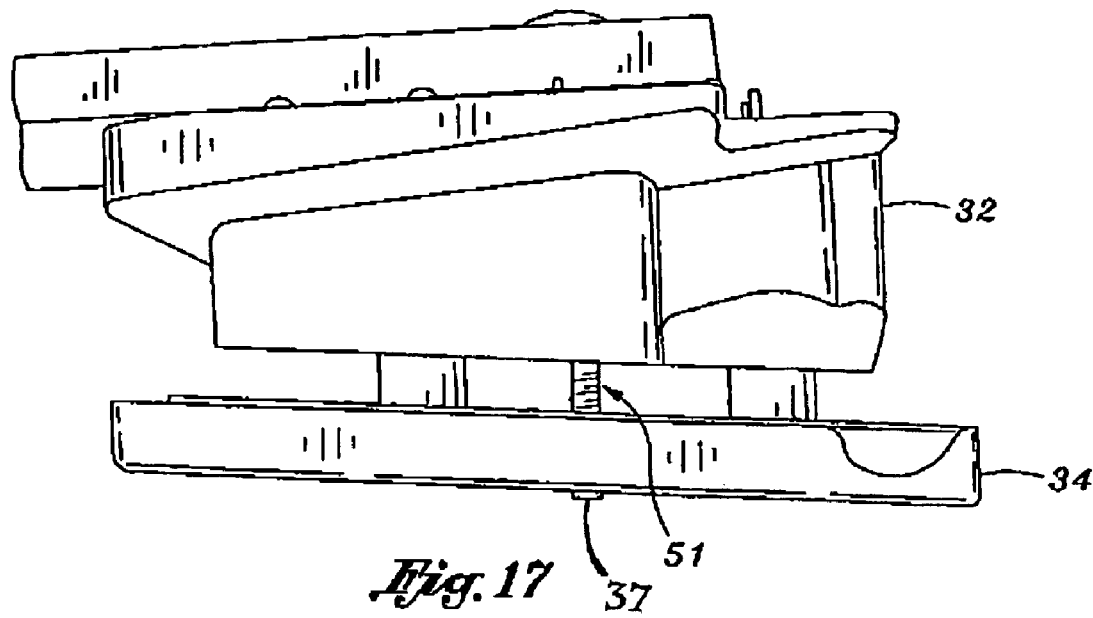
FIG. 17 depicts a top view of pole bracket halves of the present invention showing initial meshing of interlocking features.
Figure 18:
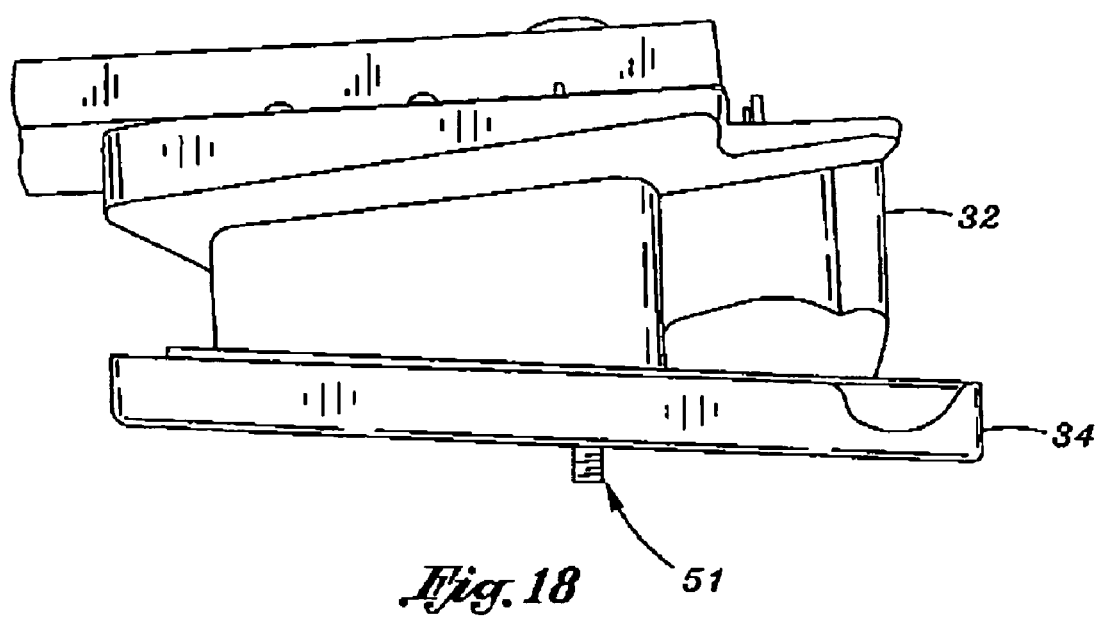
FIG. 18 depicts a top view of the fully meshed pole saw bracket halves of the present invention.

As shown in FIG. 16, the second bracket half 34 is free-standing for assembly, and the surface that contacts the handle 44 when assembled is contoured to generally conform to the opening and contours created between the handle 44 and the main body casing portion 46 of the saw 40. These interacting features control angular movement or twisting between the bracket halves and the contour conforming features of the bracket halves control angular movement between the saw 40 and bracket 30. As shown in FIG. 16, the second bracket half 34 also has one or more features disposed on the surface that contacts the handle 44 and first bracket half 32 that are complementary and interlock with the one or more mating features disposed on the mating surface of the first bracket half 32. The combination of complementary interlocking features used in the first bracket half 32 and second bracket half 34 are, in a preferred embodiment as depicted in FIGS. 16 and 17, posts and mating recesses, although other interlocking combinations such as tongues and grooves could be used.

Figure 11:
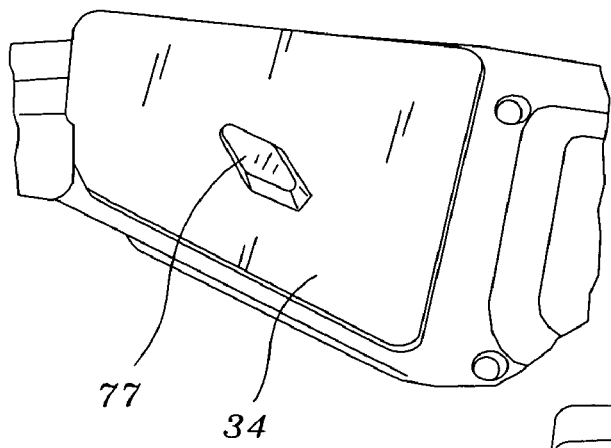
FIG. 11 depicts a fully-assembled bracket assembled with pole saw powerhead.

The second bracket half 34 also has a hole 37 disposed perpendicularly through its face which is configured to align with the hole 37 of the first bracket half 32 when the bracket 30 is assembled which receives the single point fastener 51 which in a preferred embodiment is a bolt. When assembled the fastener bolt is placed through the hole 39 of the first bracket half 32, through the handle opening and through the hole 37 of the second bracket half 34 and a matching wing-nut 77 or other nut is threaded onto the bolt 51 end protruding through the hole 37 of the second bracket half 34. FIG. 11 depicts the bracket assembly 30 in the fully assembled position with the tightening nut 77 of the single point fastening means disposed generally in the center of the bracket. FIG. 12 provides a view of the single point fastening means. A single fastener 51 extends through the aligned hole 37 in the second bracket half 34 and passes through the open space defined by handle 44. When tightened, the fastener 51 draws first bracket half 32 and the second bracket half 34 toward one another and clamps the handle 44 and casing 46 between the bracket halves 32 and 34 to secure the saw 40 in a fixed position in relation to the bracket 30.

The pole member 10 can comprise a single-length pole or a multi-section extendable or telescoping pole. The outer pole member 10 preferably is composed of a lightweight, strong, electrically insulating material such as fiberglass. Preferably the inner pole in an embodiment utilizing a telescoping pole is made of a lightweight, strong material such as fiberglass or aluminum. In embodiments where a telescoping pole member is utilized, the telescoping pole member sections can be secured to one another by clamps or other fasteners. The pole member 10 has one or more holes at its upper end 12 through which fasteners can be inserted, which, when aligned with the one or more holes disposed through the first bracket half 32, fasten the first bracket half 32 to the pole member 10.

Referring to FIG. 19, the pole member 10 in a preferred embodiment provides an internal tubular channel 72 in which an electric power cord 76 housed internally of the pole member 10. The cord 76 extends through an opening 13 in the upper end of said pole member 10 and has a receptacle 78 at its upper end 12 which, as shown in FIG. 19, is coupled to the plug 62 of the saw cord 60. The receptacle 78 effectively fixes the upper end of the power cord 76 with respect to the upper handle section 44.

The cord 76 is coupled within the channel 72 to a switch 42 mounted to said pole member 10 internally within the pole member 10 adjacent the lower end 14.

In use, the user connects the plug 84 of the external extension cord 76 to an electrical outlet socket. The pole member 10 is adjusted to provide sufficient length to enable the user to reach an elevated tree limb with the saw while standing on the ground or a ladder and grasping the lower section of the pole member 10. The user may depress the trigger 42 which energizes the motor 48 and causes the chain 52 to orbit about the bar 50. The user may then lower the bar 50 into engagement with the limb allowing the chain 52 to cut through the limb in the conventional manner. Once the limb is cut, the user releases the trigger 42 which returns outwardly to its open circuit position to interrupt power to the motor 48. The pole member 10 may then be readjusted as necessary and the steps repeated to cut additional tree limbs.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. An electric pole chain saw, comprising: an electric chain saw having a handle aperture, a main body, a trigger; a pole member having an upper end and a lower end; a bracket provided said upper end of said pole member for receiving said handle of said electric chain saw and releasably mounting said chain saw on said pole member adjacent said upper end thereof, comprising two rigid mounting bracket halves, one of which is fastened to said pole member near said upper end of said pole member, said bracket halves having surface features that generally conform to the opening and contour created by said handle aperture, a trigger depression device operative to support said trigger of said saw in a depressed "on" position and a fastening mechanism for releasably securing said bracket halves to said chainsaw handle; wherein said bracket halves each further comprise one or more complementary interlocking features to control twisting or angular movement between said two bracket halves.

2. The pole saw of claim 1, wherein said trigger depression device is integral to at least one of said mounting bracket halves.

3. The pole saw of claim 1. wherein said fastening mechanism is a hand tightenable fastener.

4. The pole saw of claim 1, further comprising an electrical extension cord disposed within said pole member having an end extending from said upper end of said pole member releasably connectable to said chain saw, mid having an opposite end relcasably connectable to an electrical power supply, end a remote switch mounted on said pole member operative when depressed to transmit electrical power to said chain saw and operative when released to stop transmission of electrical power to said chain saw.

5. The pole saw of claim 1, wherein said electric chain saw handle aperture has a knuckle guard.

6. In an electric pole chain saw comprising an electric chain saw having a handle aperture, a main body, a trigger, and a power cord and a pole member having an upper end and a lower end, an improved chain saw mouning bracket assembly provided near said upper end of said pole member for restraining said electric chain saw and releasably mounting said chain saw on said pole member adjacent said upper end thereof, providing control of angular movement or twisting between the bracket halves and angular movement between the chain saw and pole member, comprising: two rigid mounting bracket halves, one of which is fastened to said pole member near said upper end of said pole member, said bracket halves having surface features that generally conform to the opening and contour created by said handle aperture and one or more complementary interlocking features disposed on the suxface of each said bracket half that faces said chain saw when said bracket is assembled, a trigger depression device operative to support said trigger of said saw in a depressed "on" position and a fastening mechanism for releasably securing said bracket halves to said chainsaw.

7. The pole saw of claim 6, wherein said trigger depression device is integral to at least one of said mounting bracket halves.

8. The pole saw of claim 6. wherein said fastening mechanism is a hand tightenable fastener which requires no external tools to assembly and disassemble.

9. The pole saw of claim 6, wherein said electric chain handle aperture thither has a knuckle guard.

10. An electric pole chain saw, comprising: a powerhead chain saq having a handle and a handle opening; a pole connected to said powerhead chain saw by a pole bracket; said pole bracket defined by a first portion and a second portion; one of said first portion and said second. portion having an outwardly extending feature substantially conforming to said handle opening, said first bracket portion and said second bracket portion having complementary interlocking features inhibiting twisting between said first bracket portion and said second bracket portion.

11. The electric pole saw of claim 10, said outwardly extending feature engaging said handle opening contour defined by a casing, a handle, and a knuckle guard.

12. The electric pole saw of claim 10, said outwardly extending feature engaging multiple inner surfaces of said handle opening.

13. An electric pole chain saw, comprising: a pole having a first end and a second end; a pole saw bracket proximate one of said first and second end of said pole; an electric pole chain saw having a handle opening defined by a handle, a casing and a knuckle guard, said pole saw connected to said pole saw bracket; said pole saw bracket having an outwardly extending feature engaging said handle, said casing and said knuckle guard of said handle opening of said electric pole saw; said pole chain saw bracket having a first half and a second half which complementary mating features disposed on a mating surface of each of said first half and said second half.

14. An electric pole chain saw, comprising: a pole having a bracket proximate one end of said pole; a powerhead chain saw comprising a handle and at least one handle opening; said bracket comprising a first portion and a second portion; one of said first portion and said second portion having an outwardly extending feature substantially confirming and mounted into said at least one handle opening; said first and second portions of said bracket having interlocking features and at least one fastener.

15. An electric pole chain saw, comprising: a pole having a bracket proximate one end of a pole, said bracket having a trigger engagement feature formed thereon: a chain saw powerhead having a handle opening: said bracket substantially conforming to said handle opening and substantially aligning an axis of said pole with a center of mass of said poic saw and having mating interlocking features to control angular movement between a first bracket half and a second bracket half.

16. An electric pole chain saw, comprising: a powerhead chain saw having a handle and a handle opening circumscribed by said handle; a pole connected to said powerhead chain saw by a pole bracket; said pole bracket defined by a first portion and a second portion; one of said first portion and said second portion having an outwardly extending feature substantially assuming the shape or said handle opening and engaging said handle opening and also having interlocking features.

* * * * *